(12) United States Patent
Lajoie et al.

(10) Patent No.: US 7,093,244 B2
(45) Date of Patent: Aug. 15, 2006

(54) METHOD OF REMOTELY UPGRADING FIRMWARE IN FIELD-DEPLOYED DEVICES

(75) Inventors: Marie-Eve Lajoie, Beauport (CA); François St-Arnaud, Québec (CA); Steve Baril, Sainte-Foy (CA); Jacques Boivin, Saint Rédempteur (CA)

(73) Assignee: Domosys Corporation, Quebec (CA)

( * ) Notice: Subject to any disclaimer, the term of this patent is extended or adjusted under 35 U.S.C. 154(b) by 566 days.

(21) Appl. No.: 10/125,240

(22) Filed: Apr. 18, 2002

(65) Prior Publication Data

US 2004/0015952 A1 Jan. 22, 2004

Related U.S. Application Data

(60) Provisional application No. 60/284,209, filed on Apr. 18, 2001.

(51) Int. Cl.
G06F 9/44 (2006.01)

(52) U.S. Cl. .................. 717/168; 717/169; 717/171; 717/173

(58) Field of Classification Search ........ 717/167–178; 709/223; 711/112
See application file for complete search history.

(56) References Cited

U.S. PATENT DOCUMENTS

| | | | |
|---|---|---|---|
| 5,155,847 A | 10/1992 | Kirouac et al. ............. 709/221 |
| 5,325,532 A | 6/1994 | Crosswy et al. ............ 395/700 |
| 5,452,339 A | 9/1995 | Siu et al. ...................... 379/27 |
| 5,467,286 A | 11/1995 | Pyle et al. .................... 702/62 |
| 5,566,335 A | 10/1996 | Nash et al. .................... 713/1 |
| 5,623,604 A * | 4/1997 | Russell et al. .............. 717/167 |
| 5,647,056 A | 7/1997 | Barrett et al. ............... 709/220 |
| 5,696,901 A | 12/1997 | Konrad ....................... 709/203 |
| 5,701,492 A | 12/1997 | Wadsworth et al. ........ 395/712 |
| 5,737,535 A | 4/1998 | Bagley et al. ............... 709/227 |
| 5,812,857 A | 9/1998 | Nelson et al. ............... 395/712 |
| 5,815,722 A * | 9/1998 | Kalwitz et al. .............. 717/178 |
| 5,878,256 A | 3/1999 | Bealkowski et al. ........... 713/2 |
| 5,901,320 A * | 5/1999 | Takahashi et al. ........... 717/170 |
| 5,937,198 A | 8/1999 | Nelson et al. ............... 717/173 |
| 6,055,632 A | 4/2000 | Deegan et al. .............. 713/100 |
| 6,055,633 A | 4/2000 | Schrier et al. .............. 713/100 |
| 6,067,582 A | 5/2000 | Smith et al. ................... 710/5 |
| 6,075,943 A | 6/2000 | Feinman ..................... 717/175 |
| 6,112,235 A | 8/2000 | Spofford ..................... 709/223 |
| 6,115,549 A | 9/2000 | Janis et al. ................. 717/172 |
| 6,678,741 B1 * | 1/2004 | Northcutt et al. ........... 709/248 |
| 2002/0092008 A1 * | 7/2002 | Kehne et al. ............... 717/168 |

(Continued)

Primary Examiner—Kakali Chaki
Assistant Examiner—Mark P. Francis
(74) Attorney, Agent, or Firm—Bourque and Associates

(57) ABSTRACT

The method is used for downloading firmware upgrades to a non-volatile memory (NVM) of a targeted remote programmable embedded field-deployed device over a communication network. The device is connected to the network and requires no human intervention at the remote site. The firmware includes a small upgrade program which performs programming tasks on the device according to commands received by the server. The method carried out by the upgrade program allows to upgrade the application program, the communication protocol stack, a set of mutable interrupt vector table or itself without the need of additional memory. It also has a bootstrap function which is responsible for verifying the integrity of the firmware upon reset of a device before transferring control to or back to the application program. Upgrades can be either server-initiated (the firmware provider pushes the new version out to the field) or device-initiated (the device pulls the latest firmware version from the server).

22 Claims, 7 Drawing Sheets

U.S. PATENT DOCUMENTS

2004/0186952 A1* 9/2004 Hagiwara et al. ........... 711/112

2004/0215755 A1* 10/2004 O'Neill ..................... 709/223

* cited by examiner

METHOD OF REMOTELY UPGRADING FIRMWARE IN FIELD-DEPLOYED DEVICES

CROSS-REFERENCE TO RELATED APPLICATION

The present application claims the benefits of U.S. provisional patent application No. 60/284,209 filed Apr. 18, 2001, which is hereby incorporated by reference.

BACKGROUND

In the past, it has been exceedingly difficult to reprogram firmwares associated with field-deployed devices. These firmwares contain data and programs to perform a variety of tasks, including controlling a plurality of output devices in response to a plurality of input devices. The firmware data and programs, hereafter generically referred to as "firmware", are typically stored in a non-volatile memory (NVM) contained in each device. Periodically, it is necessary or desirable to upgrade the firmware of each device in order to fix bugs or to improve the performance thereof.

Several methods were devised in the past to upgrade firmware. One conventional method is that the firmware provider sends the user (or field service personnel) a new NVM containing the upgraded firmware. To perform the firmware upgrade, the old NVM which stores the previous firmware is physically removed (unplugged) from the processor module and replaced with the new NVM containing the upgraded firmware. A typical NVM used in such a scenario is one-time programmable read-only memory (ROM).

A first drawback to this method is that it is causes an undesirable transportation delay. The transportation delay is caused by the fact that the new ROM is a physical unit, which must be transported from the firmware provider up to the field-deployed device. These delays are often extremely expensive and inconvenient for users, especially if devices are taken out of operation pending the arrival of the firmware upgrade.

A second drawback to the above-mentioned method is that it is hardware intensive. Typically, the device must be physically removed from its casing and the ROM must be replaced manually. Although this approach may initially appear simple, replacing the ROM may not be the best solution in many circumstances. For instance, sockets are expensive and are often the source of reliability problems. Conversely, the removal of through-hole ROM chips that have been soldered into a board can be time consuming and difficult. If surface mount packaging is used, then specialized equipment is needed to replace the parts. Yet, even with an experienced person doing the de-soldering, there are always the risks that the whole board be ruined accidentally. Furthermore, if foundry ROM programmed-at-the-mask level is used, then there is the additional issue of the lead-time required to obtain the newer version of the parts.

A third drawback of the conventional method is that it requires additional hardware, namely the NVM itself. The firmware provider must typically incur the additional cost of providing, programming and shipping the new NVM for the purpose of performing the upgrade. Additionally, if the firmware provider does not have any NVM available when the user requests an upgrade, then the user must wait an additional period of time before the upgrade can be performed.

Another method is to replace the ROM type NVM with an electrically erasable and re-programmable, more particularly an alterable non-volatile random access memory, for instance EEPROM (electrically erasable programmable read-only memory) or Flash memory, and store the firmware therein. Conventional methods used hitherto using such memories typically include a separate interface to the field device, such as a serial port or similar access arrangement, for downloading information. For instance, U.S. Pat. No. 5,566,335 to Nash et al. teaches such a method. The EEPROM memory is generally divided in 16 kB blocks that can each hold a new version of the firmware, in effect multiplying the memory requirements for an upgradable device. U.S. Pat. No. 5,878,256 to Bealkowski et al. teaches a similar method for upgrading the BIOS firmware on personal computers.

These methods are frequently not suitable, as they generally require an operator to go near the field-deployed device in order to connect a downloading device, such as a personal computer or another programming apparatus. The operation must be repeated for each device to be upgraded. This task is thus very tedious and time consuming. It is consequently a very expensive way of achieving the necessary reprogramming of field-deployed devices. A further drawback is that on-site re-programming is often not possible because of the location of many field-deployed devices. Furthermore, the devices may be enclosed in outdoor housings which would need to be opened to access the download connection. Such openings of the housings are undesirable as adverse weather conditions can wreak havoc with the delicate electronics utilized therein.

Another possible method is to reprogram memories remotely via a network link, thereby eliminating transport delays and most, if not all, hardware manipulations. For instance, U.S. Pat. No. 6,055,632 to Deegan et al. teaches how to reprogram NVM via an Ethernet connection linking a personal computer to a communication daughter board interfaced to the device's motherboard. The firmware upgrade is downloaded to the daughter board's dual port random access memory (RAM). The daughter board then reprograms the Flash NVM from its dual port RAM. U.S. Pat. No. 6,055,633 to Schrier et al. teaches how to reprogram memories in field devices over a power communications link, by further controlling the amount of current the device under upgrade draws in the process. This method requires doubling the memory requirements because the new firmware is stored in a temporary memory area reserved for new applications. The upper memory is utilized to accept new firmware during download operations. The lower memory contains the normal, or currently running firmware. U.S. Pat. No. 5,937,198 to Nelson et al. teaches a method of remote Flash memory reprogramming that uses techniques of temporary RAM buffering and program execution as it replaces the old firmware with the upgrade. U.S. Pat. No. 5,623,604 to Russell et al. and U.S. Pat. No. 5,467,286 to Pyle et al. teach how to remotely alter firmware using similar means, by which the upgrade is first stored to RAM before being loaded in the NVM.

Although the above-cited patents teach various methods of upgrading firmware via a network link, they involve doubling memory requirements to hold the old and new versions of the firmware at a given time during the process, thus adding costs to the devices.

SUMMARY

The present invention is aimed at overcoming the above-mentioned drawbacks by providing a client-server architecture which basically consists of an upgrade server and one or more field-deployed devices. The upgrade server acts as a specialized control network node whose task is to remotely reprogram (upgrade) not only the application program of the firmware, but also other parts of the firmware as well. To achieve this goal, the firmware includes a small upgrade program which performs programming tasks on the device according to commands received by the server. The method carried out by the upgrade program allows to upgrade the application program and the base layers. It may also be used to upgrade individual sections of the base layers, such as the upgrade program itself, the communication protocol stack and a set of mutable interrupt vector table, without the need of additional memory. The upgrade program preferably has a bootstrap function which is responsible for verifying the integrity of the firmware upon reset of a device before transferring control to or back to the application program. Upgrades can be either server-initiated (the firmware provider pushes the new version out to the field) or device-initiated (the device pulls the latest firmware version from the server).

The foregoing objects, features and advantages will be more readily apparent from the following detailed description of possible and preferred embodiments thereof, which proceed with reference to the accompanying figures.

DETAILED DESCRIPTION

Figure 1:
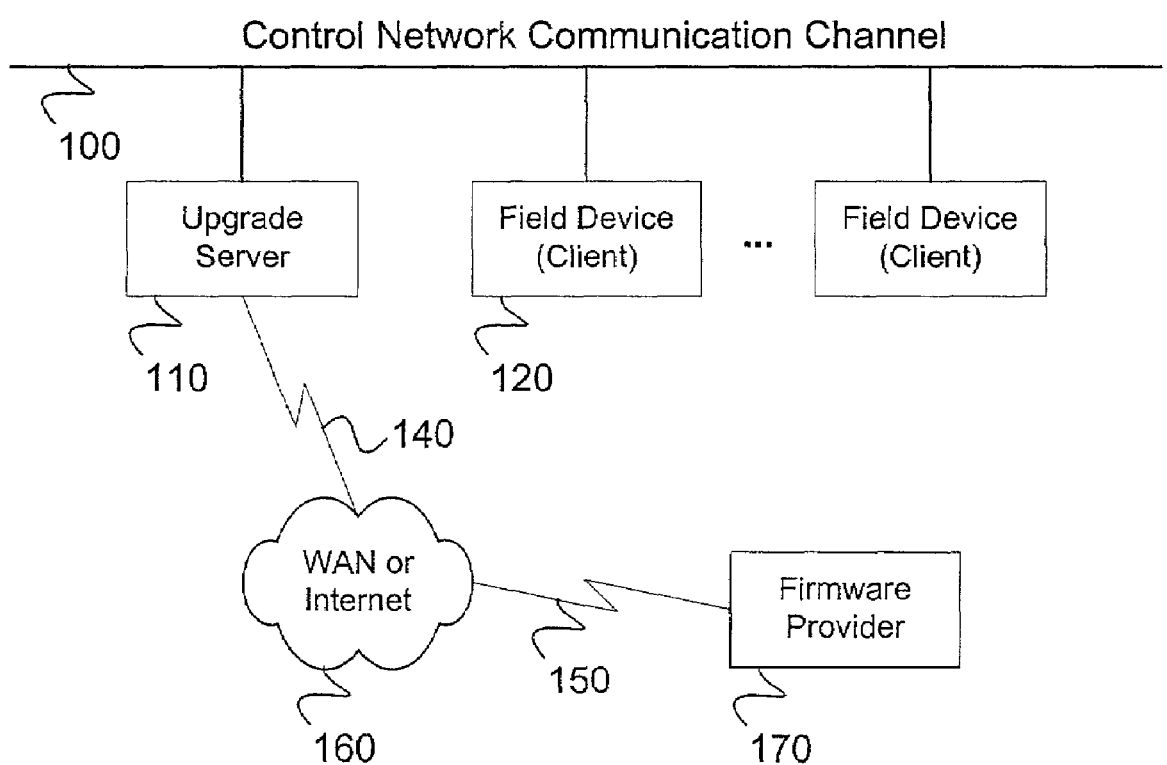
FIG. 1 is a block diagram generally illustrating an example of a network configuration.

FIG. 1 shows a block diagram of the network 100. The network 100 forms, for example, a Local Area Network (LAN) or a wide Area Network (WAN). The network 100 allows to interconnect an upgrade server 110 with one or more field-deployed devices 120. The approach utilized in the illustrated embodiment leverages the communications link that is intrinsic to devices 120. One possible embodiment is to use a power line control network. For instance, the Domosys Corporation PowerBUS™ technology may be used as the protocol on the power line LAN.

It should be noted that the expression "field-deployed device" refers to a device for which the firmware is to be upgraded, regardless of its location. The device does not necessarily need to be at a remote location. Furthermore, the term "upgrade" or "upgraded" is to be taken in a broad sense and covers the cases where a part of the firmware is only replaced by an identical version, for instance because the previous copy was corrupted. The upgrade server is referred to as the "server" hereafter.

The server 110 may be in the form of a personal computer (PC), a handheld device, a gateway, a modem or any other device with a corresponding server application. The server 110 and the device 120 integrate a transceiver. The server 110 and the firmware provider 170 are preferably connected together (permanently or on-demand), for example via a WAN or Internet link (140, 150, 160). It is also possible that the firmware provider 170 and the server 110 be a single node.

Typically, upon availability of new firmware, the corresponding file with the upgraded firmware is transferred from the firmware provider 170 to the server 110. The server 110 may also pull new firmware versions from the firmware provider 170, for instance by periodic polling. The firmware is generally an object file in HEX format, which may be compressed for transmission between the firmware provider 170 and the server 110 of a particular LAN using algorithms such as ZIP™ or the like.

The server 110 initiates the upgrade process (server-initiated upgrade) upon availability of a new firmware. First, it sends out an escape message to a device 120 that requires upgrading. Upon reception of the escape message, the device 120 breaks out of its normal operation mode and transfer the control to the upgrade program 320. From this point on, the server 110 and upgrade program 320 preferably communicate following a lock step upgrade protocol. This protocol consists of the server 110 sending out messages and waiting for an acknowledgment from the device 120 before sending out the next message. This protocol ensures a highly accurate programming of the NVM 210 of the device 120. The messages defined by the upgrade protocol consist of programming commands. These commands allow for remotely erasing, reading and writing to the device 120 being upgraded.

Alternatively, a device 120 may initiate the upgrade process if it determines that it holds a corrupted firmware (device-initiated upgrade). Such upgrade is usually done with a complete reprogramming of the firmware therein.

Figure 2:
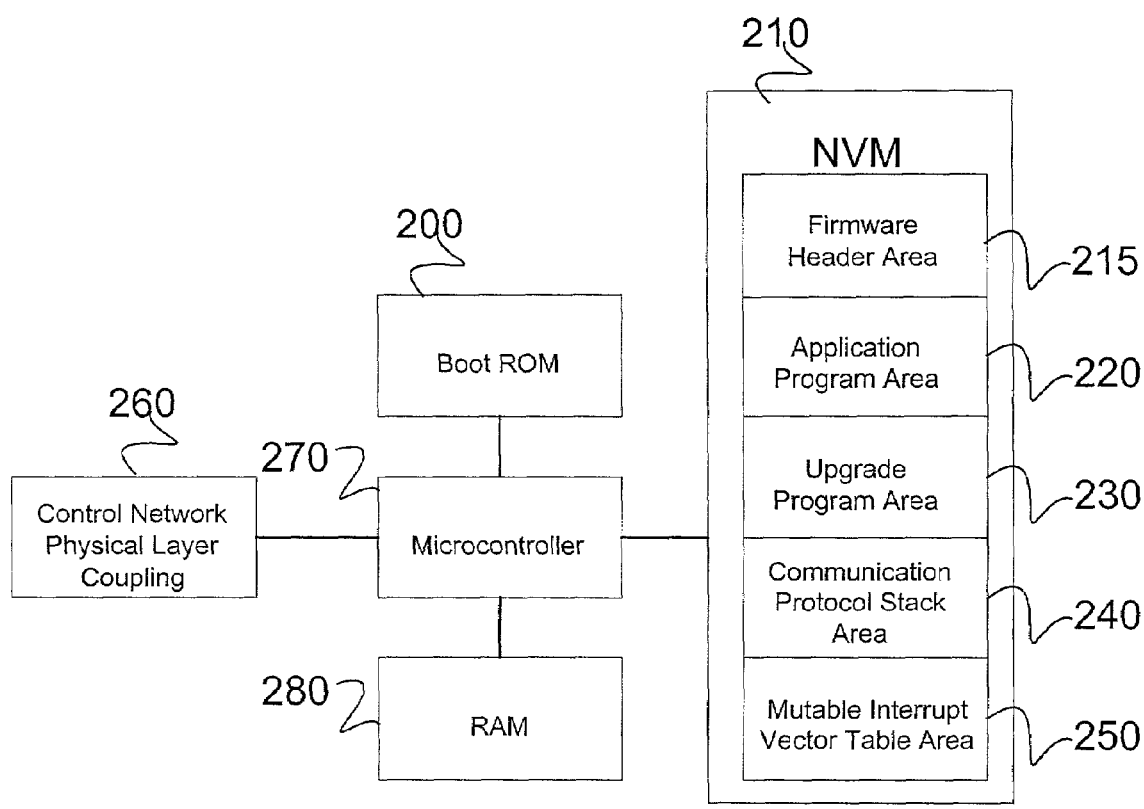
FIG. 2 is a block diagram depicting the elements of a single upgradable device in accordance with a possible and preferred embodiment.

FIG. 2 shows a block diagram of a single device 120, which device is referred to as the client in the upgrade protocol. It preferably comprises a microcontroller 270, boot ROM 200, RAM 280, NVM 210 and the network physical layer coupling module 260. The microcontroller 270 is, for instance, a Domosys U-Chip™ which is built around an Intel 8052-based core and integrates all elements depicted in FIG. 2, with the exception of some external analog components of the physical layer coupling the power line. The NVM 210 is preferably a 64 kB on-chip flash block with a 512-byte page size (128 pages). It holds re-programmable code and persistent data. The boot ROM 200 contains a library of functions for erasing, writing and reading to the NVM. The NVM 210 also includes a mutable interrupt vector table (2nd IVT) memory area 250, a communication protocol stack memory area 240, the upgrade program memory area 230, an application program memory area 220 and a firmware header memory area 215. The NVM 210 also includes other memory areas (not shown). The upgrade program memory area 230, the communication protocol stack memory area 240 and the mutable interrupt vector table (2nd IVT) memory area 250 form the base layers.

The boot ROM functions are available to the code running in the NVM 210. Furthermore, they are preferably made accessible via an external link, for instance an RS-232 serial interface and a fast parallel interface for in-factory programming and on-site reprogramming if required. However, the NVM 210 is preferably initially programmed in factory.

Figure 3:
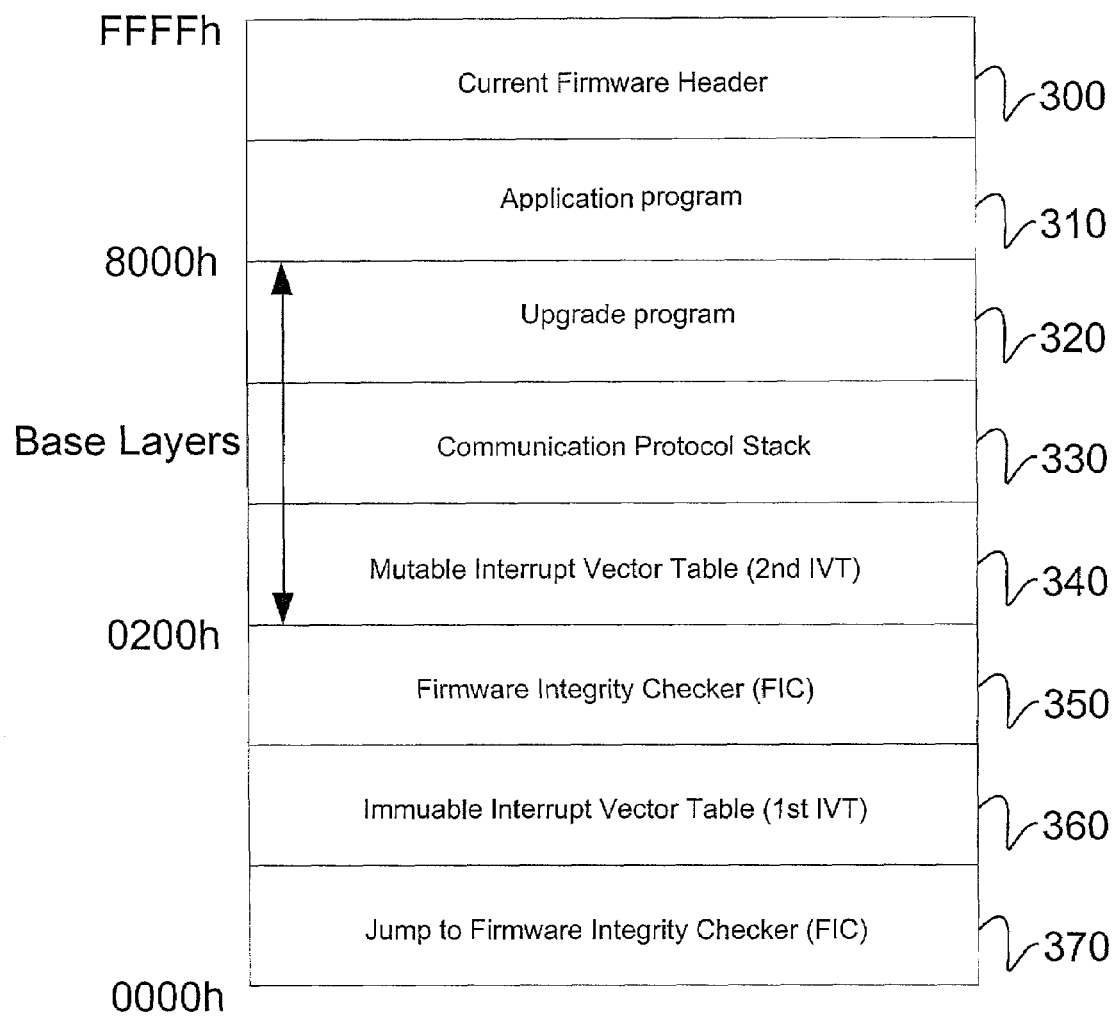
FIG. 3 depicts the modular usage of the NVM in accordance with a preferred embodiment.

FIG. 3 illustrates an example of the 64 kB NVM modular usage. The firmware integrity checker (FIC) 350 (with the jump to FIC code 370 at address 0, the reset vector) and immutable interrupt vector table (IVT) 360 are both stored within page 0. The mutable IVT 340, communication protocol stack 330 and upgrade program 320 form a module called the base layers, which starts at page 1 (address 0200h). The base layers may take up to an additional 63 512-byte pages, leaving 64 pages (32 kB), half the total memory space of the NVM 210, for the application program 310 and current firmware header 300. The application program 310 is typically the control program of the corresponding device 120.

The current firmware header 300 holds persistent data on the current application program 310 and on the state of the upgrade program 320. TABLE 1 describes some of the possible variables:

TABLE 1

| Variable | Size | Description |
| --- | --- | --- |
| VERSION NUMBER | 1 byte | The application program's main version number |
| MAJOR REVISION | 1 byte | The application program's second version number |
| MINOR REVISION | 1 byte | The application program's third version number |
| APPLICATION END PAGE | 1 byte | The last NVM page number of the application program |
| CLIENT END PAGE | 1 byte | The last NVM page number of the upgrade program |
| CLIENT STATE | 1 byte | The state of the upgrade program |
| LAST PAGE | 128 bytes | Used for recovery in case of interruption of an upgrade. Each byte of this variable represents a 512-byte NVM page. |

Figure 4:
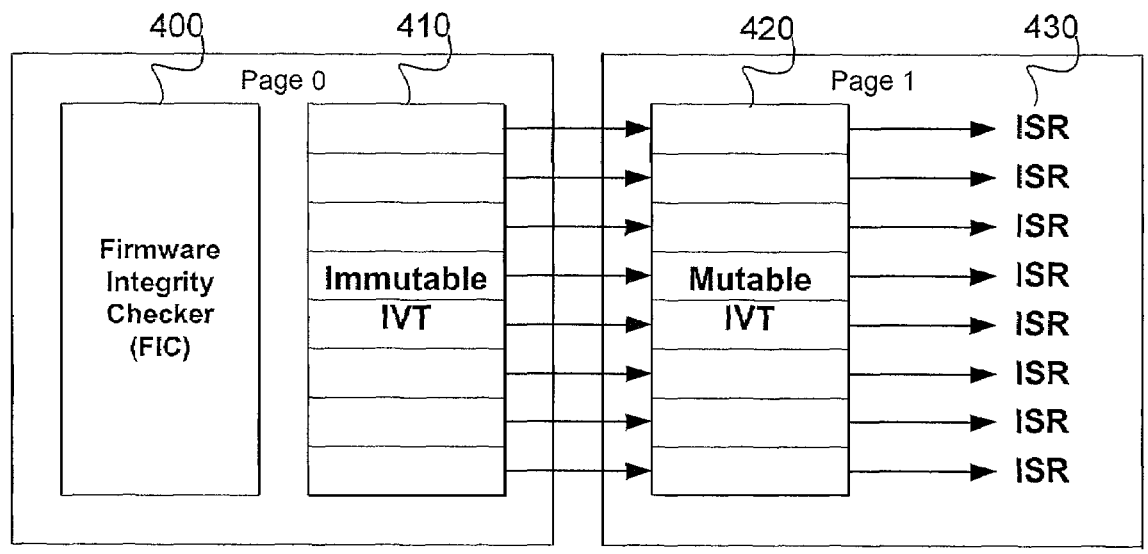
FIG. 4 depicts the double-vectored interrupt vector tables (IVTs) in accordance with a preferred embodiment.

FIG. 4 illustrates an example of the double-vectored interrupt vector tables (IVTs). Instead of pointing directly to interrupt service routines (ISRs) 430, the vectors 410 in page 0, where the FIC 400 is also located, point to other vectors 420 in page 1 that, in turn, point to ISRs 430. In the preferred embodiment, page 0, containing the FIC 400 and 1st IVT 410 is immutable (i.e.: may not be upgraded). The reason for the two IVTs is that the microcontroller always expects to find the IVT 410 in page 0. However, in the present scheme, page 0 may not be remotely upgraded. Having a double-vectored IVT thus allows the addresses of the ISRs to change between upgrades without modifying page 0.

By a series of write commands, which are acknowledged by the upgrade program 320 of the device 120 being upgraded, the server 110 can remotely reprogram most of the firmware. If the server 110 fails to receive a positive acknowledgment from the device 120, the server 110 preferably retries until all commands have succeeded. Once the server 110 has completed its programming task, the devices 120 are forced to reset. Since the upgrade program 320 also acts as a bootstrap, it takes control and allows the device 120 to run a cyclic redundancy check (CRC) on each packet received to verify its integrity. Each packet sent by the server 40 thus include a checksum number. A CRC check on the overall or parts of the new firmware is also preferably carried out. The server 110 provides the checksum number, as is well known in the art. If this verification process succeeds, control is ultimately transferred to the upgraded application program for normal operation. If the verification process fails for the application program, the device 120 sends a message to the server 110, which may then retry the upgrade process. In the case of a verification failure for the communication protocol stack 330, the device 120 is unable to communicate on the network and requires on-site maintenance for upgrading via alternate means.

Upgrade of the upgrade program 320 involves having the upgrade program 320 copy itself to or from the application program area 220 of the NVM 210 and transfer the control to this copy. The communication protocol stack 330 may also be upgraded using a similar method. Control is then returned to the newly upgraded copy. Finally, the application program 310, which was overwritten in the process, is reprogrammed. A unique advantage of the methodology of the present invention over existing field-upgradable device is that it does not require the developer to plan for two times the actual firmware memory requirements. Cost-sensitive consumer products cannot afford this extra memory cost, and so the focus to ensure success during the upgrade process, without using a significant amount of extra memory.

Two types of upgrade are possible. One is the application upgrade, where only the application program 310 is upgraded. This type of upgrade typically corresponds to the server-initiated upgrade. The second type is the self-upgrade, in which the base layers, comprising the upgrade program 320, the communication protocol stack 330 and the mutable IVT 340, are preferably upgraded. In the case of self-upgrade, the application program 310 must also be upgraded (or at least reprogrammed with the previous version), since the application program area 220 is overwritten because it is used as a temporary buffer. In both cases, the application program 310 is responsible for switching to upgrade mode by transferring control to the upgrade program 320 on reception of the appropriate message from the server 110, or in reaction to a local switch to upgrade mode. Once the upgrade program 320 takes control, it communicates with the server 110 and uses the boot ROM 200 functions to execute from the server 110.

The upgrade of the application program 310 is simply achieved by copying the new application program 310 from the server 110 to the application program memory area 220. The firmware header 300 is updated, preferably right before the upgrade of the application program 310 begins. The new firmware header 300 is useful because it indicates the last page, thus the length of the application program. Nevertheless, some embodiments may be provided with application programs having a fixed length, thus not requiring an end page or length indicator.

As aforesaid, the base layers of the firmware can be upgraded in addition to the application program 310. Although the base layers are usually completely upgraded, it is possible to upgrade only one or two of them. In the case of an upgrade of the upgrade program itself, the upgrade process preferably starts by the transferring control of the device 120 to the upgrade program 320. Instructions are then given to copy the new upgrade program 320 from the server 110 to the application program memory area 220. Once this is completed, the new upgrade program is copied to the upgrade program memory area 230 and control of the device 120 is subsequently transferred to the new upgrade program 320 therein. A new application program is finally copied from the server 110 in the application program memory area 220 since the former application program was overwritten.

The upgrade of the communication stack 240 could be achieved in a similar fashion.

The upgrade of the mutable interrupt table (2nd IVT) 340 could also be achieved in a similar fashion. However, in this case, the immutable interrupt vector table (1st IVT) 360 needs to be temporarily referenced to addresses in the application program area 220 were the mutable interrupt vector table (2nd IVT) 340 is copied. Later, once the copying of the new mutable interrupt table (2nd IVT) from the server 110 is completed, the immutable interrupt vector table (1st IVT) 360 is re-referenced to addresses in the mutable interrupt vector table (2nd IVT) memory area 250.

Figure 5:
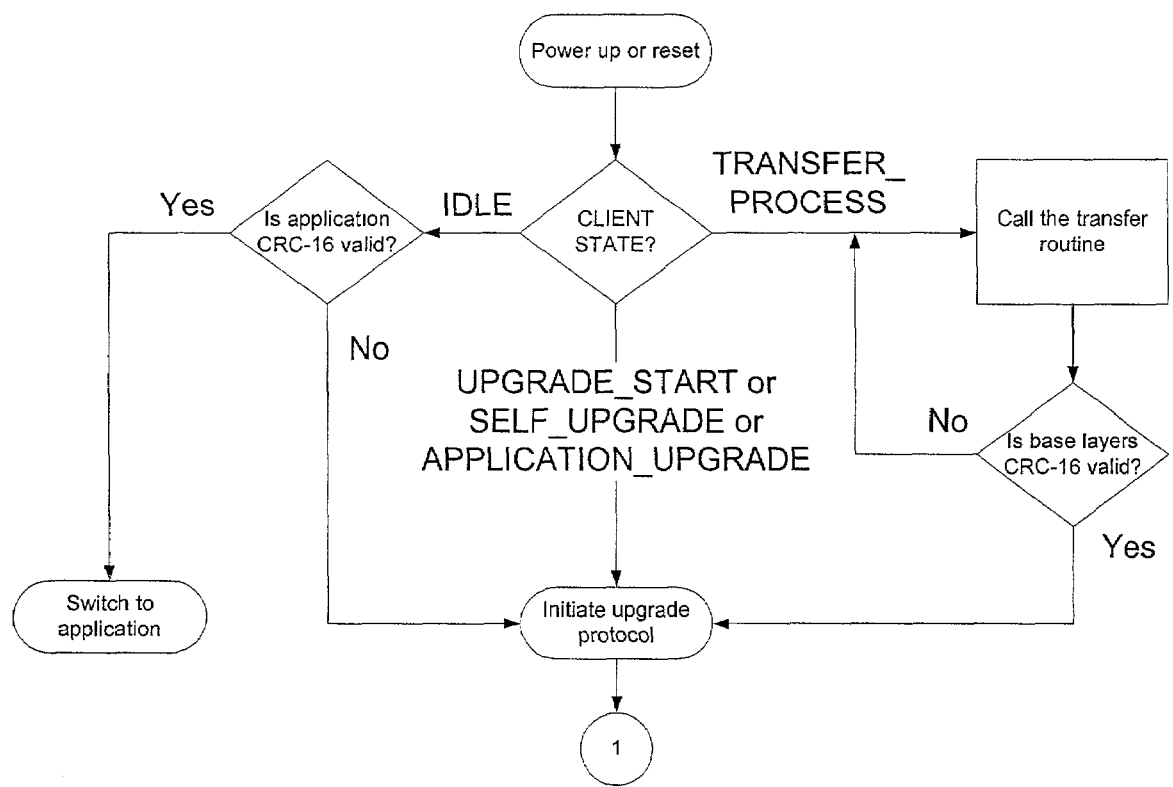
FIG. 5 is a flowchart showing the operation of the firmware integrity checker (FIC) in accordance with a preferred embodiment.

FIG. 5 shows a flowchart of the machine behavior of the firmware integrity checker (FIC) state. The FIC 350 is the first code to run when control is transferred from the boot ROM 206 to the NVM 210 after a reset or power up. As its name suggests, the FIC 350 is used to verify the validity of the firmware, but it is also responsible for transferring the data from the application layer to the base layers, in case of a self-upgrade, via the transfer routine (the application program area 220 in the NVM 210 is overwritten since it is used as a temporary buffer during a self-upgrade). In order to continue its operations between power cycles and ensure NVM integrity during upgrade, the state of the upgrade process is preferably stored in a persistent data area in NVM 210, namely the current firmware header 300. The variable is CLIENT STATE from TABLE 1. The behavior of the FIC 350 preferably depends on the value of this state variable. TABLE 2 lists the possible states:

TABLE 2

| State | Description |
|---|---|
| IDLE | The application program is running. There is no upgrade in process. |
| UPGRADE_START | The upgrade process has started. |
| SELF_UPGRADE | The device is currently processing self-upgrade. |
| TRANSFER_PROCESS | The device is currently transferring a newly received upgrade from the application program area to the base layer area. |
| APPLICATION_UPGRADE | The device is currently processing an application upgrade |

If the FIC state is IDLE, no upgrade process is running. The control can be transferred to the application program 310 if the firmware passes the CRC-16 (calculated with the polynomial $x^{16}+x^{15}+x^2+1$) check of the base layers and of the application program 310. If the firmware passes the CRC-16 integrity check, the FIC 350 transfers control to the application program 310. If the application CRC test fails, the FIC 350 switches control to the upgrade program 320. If the base layers CRC test fails, it is an indication that the communications protocol stack 330 may be corrupted, rendering remote upgrading impossible. In this case, on-site maintenance is required.

Normally, the transfer of data from the application program area 220 to the base layers memory areas is done by a transfer routine once the last page was written. Interrupts are disabled during the transfer process. Prior to the transfer, the state is set to TRANSFER_PROCESS. If, for any reason, the device 120 resets or otherwise stops before the transfer is completed, the transfer will be reinitiated after the reset or the power up, as shown in FIG. 5. At the end of the transfer routine, the device 120 resets by jumping at address 0.

Figure 6:
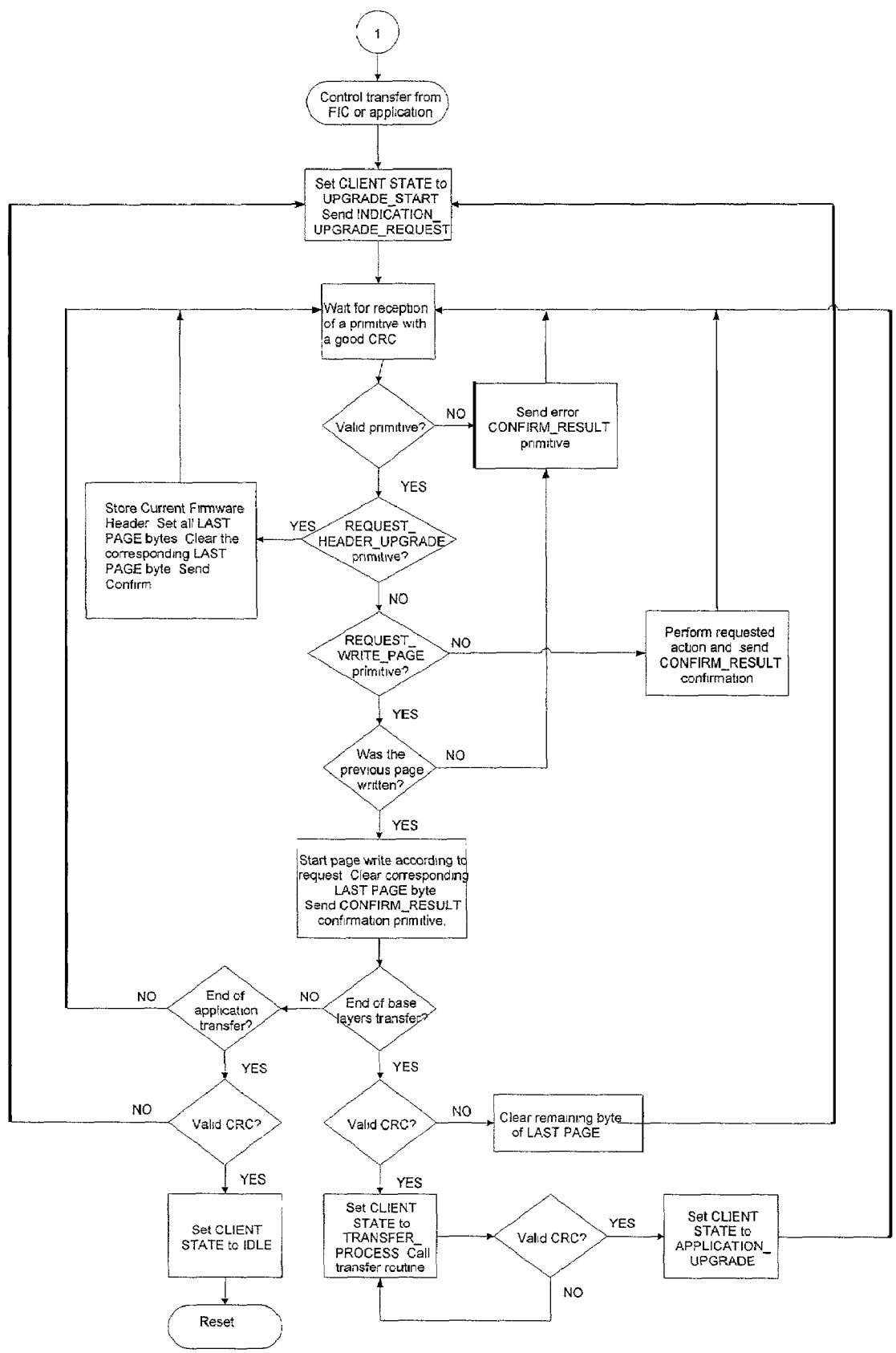
FIG. 6 is a flowchart showing the operation of the upgrade process from a device's viewpoint in accordance with a preferred embodiment.

FIG. 6 shows the operation of the upgrade process in the form of a flowchart. Commands (referred to as primitives) are sent from the server 110 to the device 120 being upgraded. These primitives are sent over the network 100. The upgrade process sits at the application layer of the communication stack, i.e. received primitives move up the stack up to the application layer. This allows for leverage of lower level features of the network 100 such as encryption and segmentation. A set of request primitives is available to the server 110, as shown in TABLE 3:

TABLE 3

| Request Primitive | Description |
|---|---|
| REQUEST_FORCE_RESET | This primitive is used by the server to remotely force a device to reset in case of a major problem. |
| REQUEST_HEADER_UPGRADE | This primitive is used to upgrade a device Current Firmware Header. Its parameters are the variables from TABLE 1 except LAST PAGE. |
| REQUEST_WRITE_PAGE | This primitive is used to program a 512-byte NVM page. This primitive has a page number parameter and up to 512 bytes of data. Confirmation of remote execution is assured by the reception of a CONFIRM_RESULT primitive. |
| REQUEST_BASIC_READ | This primitive is used to read up to 512 bytes from the NVM. It takes two parameters: the address at which to start reading and the number of bytes to read. The read data is returned CONFIRM_READ_DATA primitive. |

Upon reception of an upgrade primitive, the application program 310 that supports the remote upgrade feature must transfer control to the upgrade program 320, which will handle the request. Upon completion of the requested operation, the upgrade program 320 informs the server 110 by sending the appropriation confirm primitive, as shown in TABLE 4:

TABLE 4

| Confirm Primitive | Description |
|---|---|
| CONFIRM_RESULT | This primitive is sent to confirm the reception of a REQUEST_PAGE_WRITE or a REQUEST_HEADER_UPGRADE primitive. It takes a result code parameter that indicates success or describes failure. |
| CONFIRM_READ_DATA | This primitive is sent in response to a REQUEST_BASIC_READ primitive. Its parameter is the data read from NVM, up to 512 bytes. |

Figure 7:
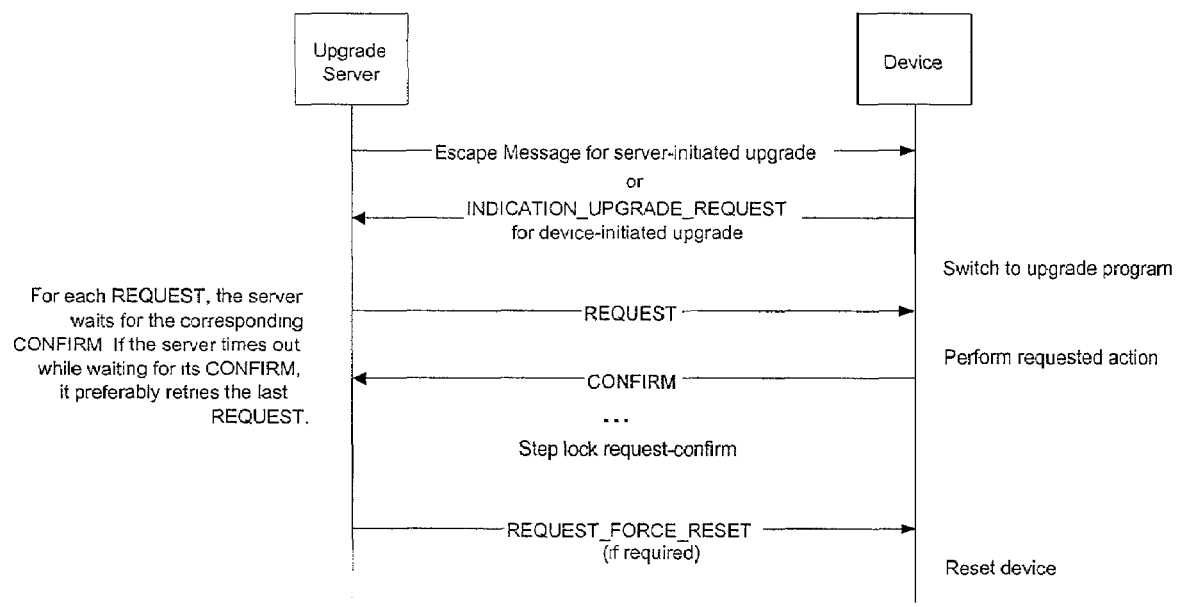
FIG. 7 is a sequence diagram illustrating the REQUEST and CONFIRM lock step mechanism used in the upgrade protocol in accordance with a preferred embodiment.

FIG. 7 illustrates an example of the lock step upgrade protocol. It illustrates a CONFIRM primitive (see TABLE 4) must acknowledge a REQUEST primitive (see TABLE 3) before the next REQUEST primitive can be sent. Therefore, the server 110 has to keep only one request on hand for retransmission. The lock step acknowledgment guarantees that all older packets have been received. Notice that the server 110 is considered the sender and the client 120 is considered the receiver. The first sends data and receives acknowledgments; the other receives data and sends acknowledgments. This protocol is very restrictive, in order to simplify implementation. For example, the lock step acknowledgement provides flow control and eliminates the need to reorder incoming data requests or keep a request list.

In use, the server 110 may upgrade one device 120 at a time or a plurality of devices 120 simultaneously. If, for some reasons, the communication is lost with one or more devices 120, for instance the server 110 does not receive a CONFIRM primitive for a REQUEST primitive, the server 110 will timeout and may retransmit its last request. It may simultaneously continue to proceed with the upgrade of the other devices 120, in the case of a plurality of devices 120 being upgraded simultaneously, and later resume the upgrade with the one or ones that failed. The LAST PAGE variable in the current firmware header 300 (see TABLE 1) is preferably used to determine the last page for which a successful upgrade was achieved before failure, thus avoiding to restart from the beginning. The LAST PAGE parameter is preferably implemented as bytes provided in a number related to the number of pages. All these bytes are initially set with a non-zero value and are cleared one by one as the upgrade progresses. The upgrade program knows that the last page is reached once all bytes are cleared. Other embodiments are also possible as well.

Yet, if the client resets during an upgrade, the server 110 will preferably receive an INDICATION_UPGRADE_REQUEST (see TABLE 5) primitive with a non-zero LAST PAGE. In that case, the server 110 will restart transmission where it failed. If the server 110 cannot restart the upgrade from the point of interruption, then it restarts transmission from the beginning. One can also choose to restart the upgrade process from the beginning in all cases where there was a failure.

TABLE 5

Indication Primitive

| | |
|---|---|
| INDICATION_UPGRADE_REQUEST | This primitive is sent by the upgrade program to initiate the upgrade protocol. In case of device-initiated upgrades, this primitive is preferably sent asynchronously, without any upgrade program interaction. For server-initiated upgrades, this primitive is sent in response to a server's request for activation of the upgrade program. This primitive uses a page number parameter. A null parameter indicates the start of an upgrade. If an upgrade is interrupted, this parameter will be set to the last successful page write. In addition, this primitive uses as parameter the variables of TABLE 1 except LAST PAGE. Finally, it preferably holds additional identification data, such as the device's serial number, product type and base layers version number. |

The upgrade protocol was designed to take the burden off the programmable devices, where resources are scarce, and delegate it mostly to the server 110. The server 110 manages the whole upgrade process, but the application program 310 is responsible for switching control to the upgrade program 320 upon reception of the request primitives. Once the device 120 is in upgrade mode, any traffic other than upgrade primitives are ignored. Any transfer actually begins with the first INDICATION_UPGRADE_REQUEST primitive sent by the device 120 to the server 110. Preferably, it is up to the server 110 to decide what kind of upgrade it will process.

As can be appreciated, the present invention allows to perform firmware upgrades without any transportation delays and without any additional hardware or on-site human intervention. It also allows to upgrade substantial parts of the firmware without the need of additional memory.

It should be noted that although a preferred embodiment of the invention has been described in detail herein and illustrated in the accompanying figures, it is to be understood that the invention is not limited to this precise embodiment and that various changes and modifications may be effected therein without departing from the scope or spirit of the present invention. For example, although the present invention was initially designed to be used with a control network, it can also be used with other networks, for instance data networks.

What is claimed is:

1. A method of remotely upgrading an application program in a field-deployed device connected to an upgrade server via a network, the device having a non-volatile memory including an application program memory area containing the application program and an upgrade program memory area containing an upgrade program, the method comprising
    transferring control of the device to the upgrade program in the upgrade program memory area to control execution of the updating of the application program; and
    updating the application program by:
        copying from the server a new application program directly to the application program memory area over at least a part of the application program memory area containing the application program; and
        transferring control of the device to the new application program stored in the application program memory area;
    after transferring control of the device to the upgrade program, updating the update program by:
        transferring control of the device to the copy of the update program in the application program memory area;
        copying from a new update program from the server to the application program memory area over at least a part of the upgrade program memory area containing the upgrade program;
        copying from the new update program from the application program memory area to the upgrade program memory area containing the upgrade program; and
        transferring control of the device to the new upgrade program in the upgrade program memory area,
    wherein
        the upgrade program memory area is comprised of base layers;
        programs are stored in separate layers of the base layers;
        the separate layers are copied from the server to the application program memory area on a layer-by-layer basis; and
        the separate layers are subseguently copied from the application program memory area to the upgrade program memory area on a layer-by-layer basis.

2. The method according to claim 1, further comprising:
    verifying the new application program in the application program memory area before transferring control of the device thereto.

3. The method according to claim 2, wherein verifying the new application program includes performing a cyclic redundancy check (CRC) thereof.

4. The method according to claim 1, wherein the new application program is copied from the server following a lock step process, the lock step process comprising:
sending a confirmation message from the device to the server once a data packet is successfully received.

5. The method according to claim 1, further comprising:
initiating an upgrade process by sending an escape message from the server to the device, the control of the device being transferred to the upgrade program as a results of the escape message.

6. The method according to claim 1, wherein the firmware further comprises a firmware header stored in a firmware header memory included in the non-volatile memory of the device, the act of copying the new application program from the server comprising:
updating the firmware header in the firmware header memory prior to receiving data for the application program to be stored in the application program memory area.

7. The method according to claim 6, wherein the firmware header comprises data indicative of the length of the new application program.

8. The method according to claim 1, further comprising:
forcing the device to reset before transferring control of the device to the new application program.

9. The method according to claim 1, further comprising:
verifying contents of a layer in the upgrade program memory area of after being copied thereto.

10. The method according to claim 9, wherein the verifying contents of a layer comprises performing a cyclic redundancy check (CRC) therof.

11. The method according to claim 1, wherein a layer of the separate layers and the new application program are copied from the server following a lock step process comprising sending a confirmation message from the device to the server once a block packet is successfully received.

12. The method according to claim 1, further comprising initiating an upgrade process by sending an escape message from the server to the device, the control of the device being initially transferred to the upgrade program as a result of the escape message.

13. The method according to claim 1, wherein the firmware further comprises a firmware header stored in a firmware header memory included in the non-volatile memory of the device, the act of copying from the server at least one new base layer comprising:
updating the firmware header in the firmware header memory prior to receiving data for the new base layer.

14. The method according to claim 13, wherein the firmware header comprises data indicative of the last page of the length of the base layers and data indicative of the length of the application program.

15. The method according to claim 13, wherein the firmware header comprises variable indicative of the last page of each layer of the base layers and a variable indicative of the last page of the application program.

16. The method according to claim 1, further comprising:
forcing the device to reset before transferring control of the device to the new application program.

17. The method according to claim 1, further comprising the act of initiating a self-upgrade process by sending a self-upgrade request message from the device to the server, each layer of the separate layers being copied from the server to the device as a result of the self-upgrade request message.

18. The method according to claim 1, wherein a layer of the separate layers includes a mutable interrupt vector table, the method further comprising:
re-referencing a plurality of addresses for a corresponding plurality of interrupt service routines for an immutable interrupt vector table contained in the mutable interrupt vector table to a plurality of new addresses for other interrupt service routines once the plurality of addresses are copied to the application memory area.

19. The method according to claim 18, wherein the other interrupt service routines relate to routines for the new application program.

20. The method according to claim 1 wherein the network is a power distribution network.

21. A remotely-upgradeable device storing an application program of a firmware, the device comprising:
a non-volatile memory including an application program memory area storing the application program and an upgrade program memory area storing an upgrade application which controls aspects of an upgrade process for the application program;
a communication connection to a server via a network;
an upgrade control module for initiating and controlling the upgrade process;
a data transfer module for obtaining from the server a new application program and storing it in the application program memory area of the device; and
an application control module to control transfer of operation of the device to the new application program,
wherein
when processing the upgrade process, the upgrade control module transfers control of the device to the upgrade program;
the data transfer module copies from the server the new application program directly to the application program memory area over at least a part of the application program memory area containing the application program;
the application control module transfers control of the device to the new application program stored in the application program memory area;
after transferring control of the device to the upgrade program, the update control module:
transfers control of the device to the copy of the update program in the application program memory area;
copies from a new update program from the server to the application program memory area over at least a part of the upgrade program memory area containing the upgrade program;
copies the new update program from the application program memor area to the upgrade program memory area containing the upgrade program; and
transfers control of the device to the new upgrade program in the upgrade program memory area,
and wherein
the upgrade program memory area is comprised of base layers;
programs are stored in separate layers of the base layers;
the separate layers are copied from the server to the application program memory area on a layer-by-layer basis; and
the separate layers are subseguently copied from the application program memory area to the upgrade program memory area on a layer-by-layer basis.

22. The remotely-upgradeable device as claimed in claim 21, further comprising:

an immutable interrupt vector table containing a plurality of addresses to a mutable interrupt vector table, wherein contents of the mutable interrupt vector table can be modified to point to a plurality of new addresses associated with new interrupt routines provided to the device in the upgrade process.

* * * * *